United States Patent
Aburada et al.

(10) Patent No.: US 9,682,882 B2
(45) Date of Patent: Jun. 20, 2017

(54) METHODS FOR PRODUCING A GLASS RIBBON

(71) Applicant: Corning Incorporated, Corning, NY (US)

(72) Inventors: Tomohiro Aburada, Kakegawa (JP); Jeffrey Robert Amadon, Lexington, KY (US); Adam Charles Berkey, Pittsburgh, PA (US); Terrence Richard Horsfall, Lexington, KY (US); Gautam Narendra Kudva, Horseheads, NY (US); Michael Yoshiya Nishimoto, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 13 days.

(21) Appl. No.: 14/334,108

(22) Filed: Jul. 17, 2014

(65) Prior Publication Data

US 2016/0016838 A1 Jan. 21, 2016

(51) Int. Cl.
 *C03B 17/06* (2006.01)

(52) U.S. Cl.
 CPC .......... *C03B 17/067* (2013.01); *C03B 17/064* (2013.01)

(58) Field of Classification Search
 CPC ...... C03B 17/067; C03B 17/06; C03B 17/068
 See application file for complete search history.

(56) References Cited

U.S. PATENT DOCUMENTS

| | | | |
|---|---|---|---|
| 3,682,609 A | 8/1972 | Dockerty | |
| 3,694,181 A * | 9/1972 | Dear | C03B 13/18 65/158 |
| 3,975,177 A | 8/1976 | Masuda | |
| 7,372,008 B2 | 5/2008 | Ohta et al. | |
| 7,717,254 B2 | 5/2010 | Brackley et al. | |
| 7,770,414 B2 | 8/2010 | Cimo et al. | |
| 8,112,163 B2 | 2/2012 | Attarwala | |
| 8,123,094 B2 | 2/2012 | John et al. | |
| 8,141,388 B2 | 3/2012 | Burdette | |
| 8,196,431 B2 | 6/2012 | Burdette et al. | |
| 8,453,478 B2 | 6/2013 | Tsuda et al. | |
| 8,459,062 B2 | 6/2013 | Ahrens et al. | |
| 8,528,364 B2 | 9/2013 | Anderson et al. | |

(Continued)

FOREIGN PATENT DOCUMENTS

| | | |
|---|---|---|
| WO | 2009070262 A1 | 6/2009 |
| WO | 2011066064 A2 | 6/2011 |
| WO | 2011146368 A2 | 11/2011 |

OTHER PUBLICATIONS

European Patent Office; International Search Report; Mail Date: Oct. 5, 2015; pp. 1-4.

(Continued)

*Primary Examiner* — Queenie Dehghan
(74) *Attorney, Agent, or Firm* — Kevin M. Able; Stephen Wentsler

(57) ABSTRACT

Methods for producing a glass ribbon include the step of drawing a glass ribbon from a quantity of molten glass and detecting an instability in the glass ribbon. In response to the detected instability, the method can further include the step of automatically adjusting an operating variable for each of a plurality of stabilizing elements simultaneously with a controller to at least partially counter the detected instability.

13 Claims, 2 Drawing Sheets

(56) References Cited

U.S. PATENT DOCUMENTS

| | | |
|---|---|---|
| 8,627,683 B2 | 1/2014 | Burdette et al. |
| 8,627,684 B2 | 1/2014 | Shultz et al. |
| 9,145,324 B2 | 9/2015 | Aburada et al. |
| 2009/0092472 A1* | 4/2009 | Luo .................. B65G 47/911 414/752.1 |
| 2009/0107182 A1* | 4/2009 | Anderson ............ C03B 13/16 65/90 |
| 2010/0241247 A1 | 9/2010 | Attarwala |
| 2011/0094267 A1 | 4/2011 | Aniolek et al. |
| 2011/0289967 A1 | 12/2011 | Burdette |
| 2012/0304695 A1 | 12/2012 | Lakota et al. |
| 2012/0318020 A1 | 12/2012 | Delia et al. |
| 2013/0074549 A1 | 3/2013 | Ahrens et al. |
| 2013/0219964 A1* | 8/2013 | Kudva ............... C03B 17/068 65/29.1 |
| 2013/0319050 A1 | 12/2013 | Agrawal et al. |
| 2014/0075994 A1 | 3/2014 | Anderson et al. |
| 2014/0083138 A1 | 3/2014 | Kogge et al. |
| 2014/0137601 A1 | 5/2014 | Aburada et al. |

OTHER PUBLICATIONS

Tokoro et al. "Sustainable UV-curable low refractive index resins with novel polymers for polymer cladding materials", Proc. Of SPIE vol. 8983, 6 pgs. XP60034953.

* cited by examiner

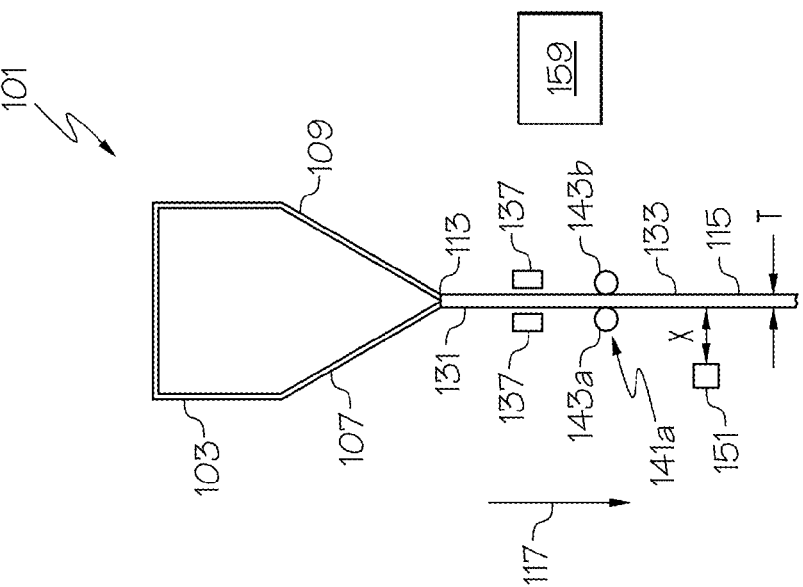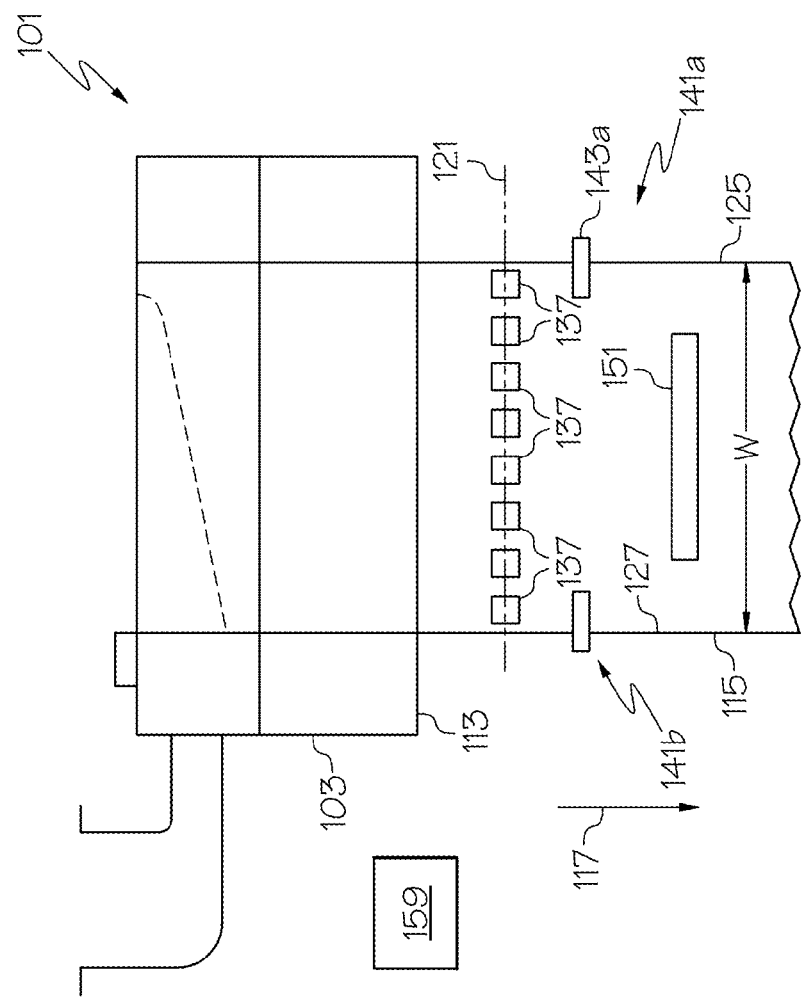

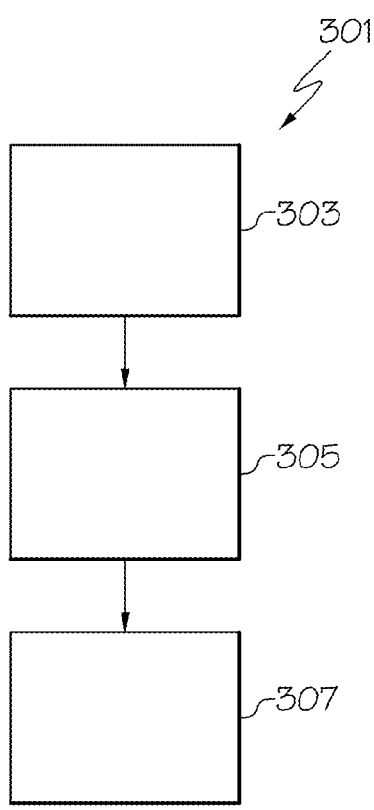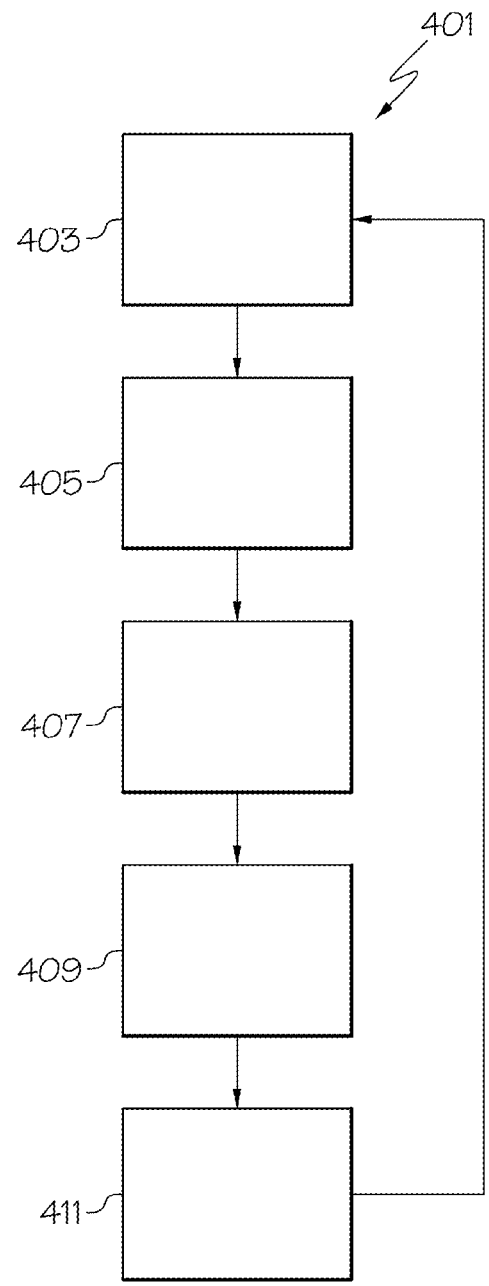
FIG. 3
FIG. 4

METHODS FOR PRODUCING A GLASS RIBBON

FIELD

The present disclosure relates generally to methods for producing a glass ribbon and, more particularly, to methods for producing a glass ribbon including automatically adjusting an operating variable of a plurality of stabilizing elements simultaneously with a controller to at least partially counter the detected instability.

BACKGROUND

Methods of producing a glass ribbon are known to include the step of drawing a glass ribbon from a quantity of molten glass. During production, undesired instabilities may arise in the glass ribbon that may disrupt further production of high-quality glass ribbon until the instability is addressed.

SUMMARY

The following presents a simplified summary of the disclosure in order to provide a basic understanding of some example aspects described in the detailed description.

In a first example aspect, a method for producing a glass ribbon includes the step of drawing a glass ribbon from a quantity of molten glass in a draw direction. The glass ribbon includes a width extending along a profile axis perpendicular to the draw direction between a first edge and a second edge of the glass ribbon. The glass ribbon further includes a thickness extending between a first major surface and a second major surface of the glass ribbon. A plurality of thermal elements are positioned along the profile axis. Each thermal element includes an adjustable operating variable. The method further includes the step of providing the glass ribbon with a first predetermined temperature profile along the profile axis. The method further includes the step of automatically adjusting the adjustable operating variable of each thermal element simultaneously with a controller based on an input into the controller to automatically change the first temperature profile to a second temperature profile that is predetermined.

In one example of the first aspect, the first temperature profile of the step of providing the glass ribbon facilitates maintenance of a first thickness of the glass ribbon along the width of the glass ribbon, and the second temperature profile of the step of automatically adjusting facilitates maintenance of a second thickness of the glass ribbon along the width of the glass ribbon that is greater than the first thickness.

In another example of the first aspect, the input of the step of automatically adjusting represents an instability in the process of drawing the glass ribbon. For instance, in one example, the instability comprises a discontinuity of the glass ribbon.

In another example of the first aspect, the second temperature profile is higher in temperature than the first temperature profile.

In still another example of the first aspect, the controller is in communication with a plurality of predetermined temperature profiles and, during step of automatically adjusting, the controller selects the second temperature profile from the plurality of predetermined temperature profiles based on the input.

In yet another example of the first aspect, the plurality of thermal elements comprise a plurality of heating elements and the adjustable operating variable of each heating element comprises a heating parameter of the heating element.

In a second example aspect, a method for producing a glass ribbon comprises the steps of drawing a glass ribbon from a quantity of molten glass and detecting an instability in the glass ribbon. In response to the detected instability, the method further includes the step of automatically adjusting an operating variable for each of a plurality of stabilizing elements simultaneously with a controller to at least partially counter the detected instability.

In one example of the second aspect, during the step of drawing, the controller operates the stabilizing elements with a first operating profile. In another particular example, during the step of automatically adjusting, the first operating profile of the stabilizing elements is automatically switched by the controller to a second operating profile to at least partially counter the detected instability. In one example, the controller is in communication with a plurality of predetermined operating profiles and, during the step of automatically adjusting, the controller selects the second operating profile from the plurality of predetermined operating profiles based on the input. In another example, the first operating profile facilitates maintenance of a first thickness of the glass ribbon and the second operating profile facilitates maintenance of a second thickness of the glass ribbon that is predetermined and greater than the first thickness. In still another example, after the step of automatically adjusting, the method further includes the step of detecting a stability in the glass ribbon. In response to detecting the stability, the method further includes the step of automatically switching the second operating profile of the stabilizing elements back to the first operating profile with the controller.

In another example of the second aspect, the step of automatically adjusting at least partially counters the detected instability by adjusting the operating variable for each of the plurality of stabilizing elements to increase a thickness of the glass ribbon.

In yet another example of the second aspect, the instability detected during the step of detecting an instability comprises a discontinuity in the glass ribbon.

In still another example of the second aspect, the stabilizing elements each comprise a thermal element. In one example, the operating variable for each of the stabilizing elements comprises a heating parameter of the thermal element, and the step of automatically adjusting at least partially counters the detected instability by adjusting the heating parameter of the thermal element to increase a temperature of the glass ribbon.

In a further example of the second aspect, the stabilizing elements each comprise a pulling roll. In one example, the operating variable for each of the stabilizing elements comprises a contact status of the pulling roll with the glass ribbon, wherein during the step of automatically adjusting, the contact status of the pulling roll is automatically switched by the controller from an engaged position wherein the pulling roll contacts the glass ribbon to a disengaged position wherein the pulling roll is not in contact with the glass ribbon. In another example, the operating variable for each of the stabilizing elements comprises a pulling roll speed of the pulling roll.

BRIEF DESCRIPTION OF THE DRAWINGS

These and other features, aspects and advantages of the present disclosure are better understood when the following detailed description is read with reference to the accompanying drawings, in which:

FIG. 1 schematically illustrates an example apparatus for producing a glass ribbon;

FIG. 2 schematically illustrates a side view of the example apparatus of FIG. 1;

FIG. 3 is a flow chart illustrating steps of a first example method for producing a glass ribbon using the example apparatus of FIG. 1; and FIG. 4 is a flow chart illustrating steps of a second example method for producing a glass ribbon using the example apparatus of FIG. 1.

DETAILED DESCRIPTION

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

FIGS. 1 and 2 illustrate an example apparatus 101 for producing a glass ribbon. The figures schematically illustrate an example fusion draw apparatus 101, although up draw, slot draw or other glass forming techniques may be used with aspects of the disclosure in further examples. The illustrated fusion draw apparatus 101 comprises a forming wedge 103 with a pair of downwardly inclined forming surface portions 107, 109 extending between opposed ends of the forming wedge 103 that converge to form a root 113. Molten glass may be fed to the forming wedge 103 such that the molten glass flows along the inclined forming surface portions 107, 109 and meets at the root 113, producing a glass ribbon 115. The glass ribbon 115 can be drawn from the root 113 in a downward draw direction 117 that is substantially vertical. The glass ribbon 115 can include a thickness T extending between a first major surface 131 and a second major surface 133 of the glass ribbon 115. The glass ribbon 115 can further include a width W extending along a profile axis 121 between a first edge 125 and a second edge 127 of the glass ribbon 115. The profile axis 121 may be orthogonal (i.e. perpendicular) to the draw direction 117, as shown in FIGS. 1 and 2, or the profile axis 121 may be non-orthogonal (e.g. parallel) to the draw direction 117. The profile axis 121 may be fixed relative to the forming wedge 103 such that the moving glass ribbon 115 passes through the profile axis 121 or the profile axis 121 may be fixed relative to the glass ribbon 115 such that the profile axis 121 travels with the glass ribbon 115. Alternatively, the profile axis 115 may move relative to both the forming wedge 103 and the glass ribbon 115.

The fusion draw apparatus 101 can comprise various elements that can be useful in achieving one or more target attributes and/or removing one or more instabilities in the glass ribbon 115. Target attributes can comprise, for example, a thickness, temperature, or draw speed of the glass ribbon 115. Meanwhile, instabilities can comprise, for example, vibrations in the glass ribbon, a crack in the glass ribbon, a full break (i.e. discontinuity) in the glass ribbon, or any other condition that inhibits processing of the high quality glass ribbon.

The fusion draw apparatus 101 can comprise a plurality of thermal elements 137 that each comprise an adjustable operating variable that may be adjusted to vary a parameter of the heat that is applied to or removed from the glass ribbon 115 by the corresponding thermal element 137. For example, the plurality of thermal elements 137 may comprise a plurality of heating elements and the adjustable operating variable of each heating element can comprise a heating parameter of the corresponding heating element. For instance, each heating element may be an electric heating coil and the adjustable operating variable can comprise a current applied to the heating coil that may be adjusted to control the amount of heat radiated from the heating coil and applied to the glass ribbon 115. Alternatively, the adjustable operating variable may be a distance between the glass ribbon 115 and the corresponding heating element or a location of the corresponding heating element along the major surfaces 131, 133 of the glass ribbon 115. As another example, in addition or alternatively, the plurality of thermal elements 137 may comprise a plurality of cooling elements and the adjustable operating variable of each cooling element can comprise a cooling parameter of the corresponding cooling element. For instance, each cooling element may be a fluid-cooled cooling coil and the adjustable operating variable can comprise the flow rate of cooling fluid that flows through the cooling element and may be adjusted to control the rate at which heat is removed from the glass ribbon 115. Alternatively, the adjustable operating variable may be a distance between the glass ribbon 115 and the corresponding cooling element or a location of the corresponding cooling element along the major surfaces 131, 133 of the glass ribbon 115. In another embodiment the adjustable operating variable may be a temperature of the cooling fluid provided to the cooling element. In yet another embodiment, the operational variable may be the material of construction of the cooling element, thereby changing the emissivity of the radiation heat transfer. The plurality of thermal elements 137 may comprise a combination of heating and cooling elements and the adjustable operating variables of the thermal elements 137 may comprise a combination of heating and cooling parameters. Moreover, each thermal element 137 may comprise multiple adjustable operating variables.

The operating variables of the thermal elements 137 can be adjusted to control a temperature profile of the glass ribbon 115 along a profile axis of the glass ribbon 115. For example, as shown in FIG. 1, the plurality of thermal elements 137 may be positioned along the profile axis 121 of the glass ribbon 115 such that the operating variables of the thermal elements 137 can be adjusted to control a temperature profile of the glass ribbon 115 along the profile axis 121. The plurality of thermal elements 137 may be fixed relative to the profile axis 121 or the plurality of thermal elements 137 may move relative to the profile axis 121. For instances wherein the profile axis 121 is moving relative to the forming wedge 103, the plurality of thermal elements 137 can travel with the profile axis 121 or the plurality of thermal elements 137 can remain stationary relative to the forming wedge 103. In some embodiments, the plurality of thermal elements 137 can move relative to both the profile axis 121 and the forming wedge 103.

The operating variables of the thermal elements 137 can be adjusted to provide any number of temperature profiles along the profile axis 121. For example, the operating variables of the thermal elements 137 can be adjusted to provide a first temperature profile along the profile axis 121. As another example, the operating variables of the thermal elements 137 can be adjusted to provide a second temperature profile along the profile axis 121. The operating variables of the thermal elements 137 may be adjusted to provide any number of temperature profiles along the profile axis 121 or any other profile axis of the glass ribbon 115.

The ability to adjust the operating variables of the thermal elements 137 can be useful in achieving process stability and/or target attributes for the glass ribbon 115. For example, if the glass ribbon 115 experiences an instability such as a crack in the glass ribbon 115, the operating variables may be adjusted to raise the temperature profile to a higher temperature to prevent crack propagation in the glass ribbon 115. In such examples, the average temperature of the temperature profile can be increased to prevent crack propagation in the glass ribbon 115. For instance, the heat may be adjusted to a higher level by stepping up the heat output of each thermal element by the same amount or same percentage. As another example, the operating variables of the thermal elements 137 can also be adjusted to account for emissivity changes in the glass ribbon 115. For instance, if a thickness of the glass ribbon 115 along the profile axis 121 is adjusted, the emissivity of the glass ribbon 115 along the profile axis 121 will also change. This change in emissivity will affect radiant heat transfer across the profile axis 121. Thus, to maintain a temperature profile along the profile axis 121 during and after adjustment of the thickness, the operating variables of the thermal elements 137 can be adjusted to vary the amount of heat applied to the profile axis 121 and so as to account for the changes in emissivity.

The fusion draw apparatus 101 can further comprise a plurality of pulling roll assemblies 141*a*, 141*b* that, in some examples, can each comprise an adjustable operating variable. For example, the pulling roll assembly 141*a* may comprise a first pulling roll 143*a* and a second pulling roll 143*b* that are arranged on opposite sides of the glass ribbon 115 such that the glass ribbon 115 passes between the first pulling roll 143*a* and a second pulling roll 143*b*. The adjustable operating variable of the pulling roll assembly 141*a* may comprise a contact status between the first and second pulling rolls 143*a*, 143*b* and the glass ribbon 115. For example, the contact status can comprise a first "engaged position" wherein the first and second pulling rolls 143*a*, 143*b* are spaced apart by an operating distance such that the first and second pulling rolls 143*a*, 143*b* contact the first and second major surfaces 131, 133 of the glass ribbon 115 to control the thickness of the glass ribbon 115 passing therebetween. In a further example, the contact status can comprise a second "engaged position" wherein the operating distance between the first and second pulling rolls 143*a*, 143*b* is increased to allow for thickened edges of the glass ribbon 115 between the first and second pulling rolls 143*a*, 143*b*. In a further example, the contact status can comprise a "disengaged position" wherein the first and second pulling rolls 143*a*, 143*b* are spaced apart such that they do not contact the first and second major surfaces 131, 133 of the glass ribbon 115. In the "disengaged position", the glass ribbon 115 will be unconstrained by the first and second pulling rolls 143*a*, 143*b*. Unconstrained operation may be desirable under certain situations to allow free movement of the glass ribbon to help at least partially counter an instability in the glass ribbon. On the other hand, when the operating distance between the first and second pulling rolls 143*a*, 143*b* is narrowed such the first and second pulling rolls 143*a*, 143*b* contact the first and second major surfaces 131, 133 of the glass ribbon 115, the glass ribbon 115 will be constrained by the first and second pulling rolls 143*a*, 143*b*. Thus, the contact status of the first and second pulling rolls 143*a*, 143*b* may be adjusted to provide constraint to the glass ribbon 115 and, as set forth below, facilitate maintenance of the desired thickness T of the glass ribbon 115.

The adjustable operating variable of the pulling roll assembly 141*a* may alternatively or additionally comprise the pulling roll rotational speeds of the first and/or second pulling rolls 143*a*, 143*b*. When the first and second pulling rolls 143*a*, 143*b* are oriented in the "engaged position", each pulling roll respectively engages the first and second major surfaces 131, 133 of the glass ribbon 115. In the engaged position, the pulling roll speeds of the first and/or second pulling rolls 143*a*, 143*b* may be adjusted to control the drawing speed of the glass ribbon 115 in the draw direction 117 and the thickness T of the glass ribbon 115 along the width W of the glass ribbon 115. For example, the pulling roll speeds of the first and second pulling rolls 143*a*, 143*b* may be increased to increase the drawing speed of the glass ribbon 115 or decreased to decrease the drawing speed of the glass ribbon 115. Decreasing the drawing speed of the glass ribbon 115 can be particularly helpful when an instability is detected in the glass ribbon 115, as the reduced speed will slow down the draw of the glass ribbon off the root 113 to thereby increase the thickness T of the glass ribbon to help at least partially counter an instability in the glass ribbon. Indeed, increasing the thickness T of the glass ribbon can increase the stiffness and reduce the probability of crack propagation in the glass ribbon 115. Once the instability is countered, the draw speed can be increased again to provide the desired thickness T during normal operating conditions. Thus, pulling roll speeds of the first and second pulling rolls 143*a*, 143*b* may be adjusted to control the drawing speed of the glass ribbon 115 and facilitate maintenance of the thickness T of the glass ribbon 115 along the width W of the glass ribbon 115.

The fusion draw apparatus 101 can further comprise one or more instability detectors configured to detect the presence of instabilities in the glass ribbon 115. For example, as shown in FIGS. 1 and 2, the fusion draw apparatus 101 can comprise an instability detector 151. An instability may be any condition of the glass ribbon 115 that disrupts the processing of the glass ribbon 115. For example, as discussed above, an instability may comprise vibrations in the glass ribbon 115, a crack in the glass ribbon 115, a full break (i.e. discontinuity) in the glass ribbon 115, or any other condition that inhibits processing of the high quality glass ribbon 115. The instability detector 151 in the present example can comprise an ultrasonic sensor that monitors the distance X between the instability detector 151 and the glass ribbon 115. The instability detector 151 can therefore detect if there are excessive vibrations in the glass ribbon 115 or if there is a discontinuity in the glass ribbon 115 by monitoring for changes in the distance X. The fusion draw apparatus 101 in other examples may comprise alternative or additional instability detectors. For example, the fusion draw apparatus 101 may comprise an optical sensor that similarly detects discontinuities in the glass ribbon 115. As another example, the fusion draw apparatus 101 may comprise a torque sensor that measures a torque in one of the first and second pulling rolls 143*a*, 143*a* to determine if there is glass ribbon present between and engaged with the first and second pulling rolls 143*a*, 143*a* and/or whether there is a significant decrease in weight of the glass ribbon below the pulling rolls that may indicate a discontinuity of the glass ribbon below the pulling rolls.

The fusion draw apparatus 101 can further comprise one or more stabilizing elements that may be operated to at least partially counter a detected instability in the glass ribbon 115. In the present example, the plurality of thermal elements 137 and the pulling roll assemblies 141*a*, 141*b* can comprise the stabilizing elements. The operating variables of the stabilizing elements may be adjusted to at least partially counter a detected instability in the glass ribbon 115. For example, the pulling roll speeds of the first and second pulling rolls 143a, 143b of the pulling roll assembly 141a may be decreased to thicken the glass ribbon 115. Thickening the glass ribbon 115 can make the glass ribbon 115 more stiff and resistant to breakage, which can inhibit further instabilities and allow operators or other machinery to handle the glass ribbon 115 if needed to correct the instability. Moreover, decreasing the speed of the first and second pulling rolls 143a, 143b will decrease the speed of the glass ribbon 115, which can make it easier for operators or machinery to handle the glass ribbon 115 and correct the instability. As another example, if an instability is detected in the glass ribbon 115 while the first and second pulling rolls 143a, 143b of the pulling roll assembly 141a are engaged with the glass ribbon 115, the operating distance between the first and second pulling rolls 143a, 143b may be increased to also allow thickened edges of the glass ribbon 115 to pass through the pulling rolls, thereby stiffening the edges of the glass ribbon 115 to resist instabilities that may otherwise pass through the edges of the glass ribbon 115. Moreover, the contact status of the first and second pulling rolls 143a, 143b may be adjusted from the engaged position to a disengaged position, thus allowing the glass ribbon 115 to hang unconstrained during an instability and preventing the possibility of breakage due to restraint by the first and second pulling rolls 143a, 143b. As yet another example, if a crack in the glass ribbon 115 is detected while the glass ribbon 115 is provided with a first temperature profile at the profile axis 121, the operating variables of the plurality of thermal elements 137 may be adjusted to provide the glass ribbon 115 with a second temperature profile at the profile axis 121 that is higher in temperature than the first temperature profile, thus mitigating the chance of crack propagation. Any one of the above-referenced example stabilizing adjustments may be performed to at least partially counter a detected instability in the glass ribbon 115. In further examples, any combination of the above-referenced example stabilizing adjustments may be performed (e.g., simultaneously, sequentially, etc.) to at least partially counter a detected instability in the glass ribbon 115.

Although the plurality of thermal elements 137 and the pulling roll assemblies 141a, 141b constitute the stabilizing elements in the present example, the fusion draw apparatus 101 may comprise other types of stabilizing elements in other examples. For instance, the fusion draw apparatus 101 may comprise positioning elements such as, for example, air bearings that control the position of the glass ribbon 115 and help stabilize the glass ribbon 115. In addition, there may be examples where only the thermal elements 137 or only the pulling roll assemblies 141a, 141b are provided as stabilizing elements. The fusion draw apparatus may comprise any variety of stabilizing elements that may be operated to at least partially counter a detected instability in the glass ribbon 115 and comprise an adjustable operating variable.

The fusion draw apparatus 101 can further comprise a controller 159 configured to automatically adjust the adjustable operating variables discussed above based on one or more inputs provided to the controller 159. Various methods for producing a glass ribbon may be accomplished with the controller 159. For example, FIG. 3 illustrates a flow diagram of a first example method 301 that controls the thermal elements 137 of the fusion draw apparatus 101. This example method 301 may be used to adjust the operating variables of the thermal elements 137 to either accommodate for a detected instability in the glass ribbon 115 or to accommodate for a change in process conditions. The first example method 301 comprises a step 303 of drawing the glass ribbon 115 from a quantity of molten glass from the forming wedge 103 in the downward draw direction 117 such that the glass ribbon 115 includes the width W extending along the profile axis 121. Step 303 further provides the glass ribbon 115 with the thickness T extending between the first and second major surfaces 131, 133 of the glass ribbon 115, and the plurality of thermal elements 137 positioned along the profile axis 121.

The first example method 301 further comprises a step 305 of providing the glass ribbon 115 with a first temperature profile along the profile axis 121. For example, the first temperature profile may be provided to facilitate drawing of the glass ribbon with desired characteristics under normal operating conditions. For example, the operating variables of the thermal elements 137 can be set to provide the glass ribbon 115 with a first temperature profile that is predetermined and facilitates maintenance of a first thickness T of the glass ribbon 115 along the width W of the glass ribbon 115. The operating variables can either be set manually by an operator or automatically by the controller 159.

The first example method 301 further comprises a step 307 of automatically adjusting the adjustable operating variables of the thermal elements 137 simultaneously with the controller 159 based on an input into the controller 159 to maintain the first temperature profile or automatically change the first temperature profile to a second temperature profile that is predetermined. For example, an input may be provided to the controller 159 indicating that a process condition such as, for example, a thickness of the glass ribbon 159, has changed. Based on the input, the controller 159 may automatically adjust the operating variables of the thermal elements 137 to account for changes in emissivity in the glass ribbon 115 and maintain the first temperature profile. As another example, the controller 159 can be in communication with a plurality of predetermined temperature profiles that may be stored in a database. Based on the input provided to the controller 159, the controller 159 can select one of the predetermined temperature profiles and automatically change the first temperature profile to the selected predetermined temperature profile. For instance, if an input A is provided to the controller 159, the controller 159 may select one of the predetermined temperature profiles and automatically change the first temperature profile to the corresponding predetermined temperature profile. As an alternative example, if an input B is provided to the controller 159, the controller 159 may select a different predetermined temperature profile and automatically change the first temperature profile to the corresponding predetermined temperature profile. The selected temperature profile will depend on what input is provided to the controller 159. Each of the plurality of predetermined temperature profiles can be designed to counter various instability conditions detected in the fusion draw process and/or achieve target attributes for the glass ribbon 145. For instance, one predetermined temperature profile may be designed to increase the average temperature of the temperature profile along the profile axis 121 of the glass ribbon 115 to mitigate propagation of a crack in the glass ribbon 145. Moreover, another predetermined temperature profile may be designed to facilitate maintenance of a desired thickness T.

As mentioned above, the controller 159 can simultaneously adjust the adjustable operating variables of the thermal elements 137 based on the input provided to the controller 159. For example, if an input is provided to the controller 159 that causes the controller 159 to select a second temperature profile that is higher in temperature than the first temperature profile, the heating parameters of each heating element may be adjusted simultaneously by the controller 159 to increase the amount of heat applied by each of the thermal elements 137 to the glass ribbon 115. As another example, if an input is provided to the controller 159 that causes the controller 159 to select a second temperature profile that is lower in temperature than the first temperature profile, each heating element may be adjusted simultaneously by the controller 159 to decrease the amount of heat applied by each of the thermal elements 137 to the glass ribbon 115.

In alternative examples, if the fusion draw apparatus 101 is provided with cooling elements, the controller 159 may simultaneously adjust the cooling parameters of each cooling element to control the amount of cooling applied to the glass ribbon 115. The controller 159 can simultaneously adjust any combination of the adjustable operating variables of the thermal elements 137 described above to maintain the first temperature profile or to automatically change the first temperature profile to the second temperature profile in step 307. Moreover, although the controller 159 can adjust these adjustable operating variables simultaneously, the adjustment of each variable need not always be simultaneous with the others. For instance, the controller 159 may begin adjustment of a first set of operating variables and after a set time, begin simultaneous adjustment of a second set operating variable. Indeed, some variables may not even need adjustment to automatically change the first temperature profile to the second temperature profile.

The input provided to the controller 159 in step 307 may be provided manually by an operator when, for example, target attributes in the glass ribbon 115 require a certain predetermined temperature profile along the profile axis 121 that is different from the temperature profile currently being provided. Alternatively, the input may be provided to the controller 159 by the instability detector 151 upon detection of an instability such as, for example, a discontinuity in the glass ribbon 115. The input in some examples can represent the instability and cause the controller 159 to select a second temperature profile that is designed to at least partially counter the instability. However the input is provided, the controller 159 can simultaneously adjust the operating variables of the thermal elements 137 to maintain the first temperature profile or automatically change the first temperature profile to a predetermined temperature profile that corresponds with the input. This simultaneous adjustment can inhibit the occurrence of further instabilities that may otherwise occur if each of the operating variables were adjusted sequentially. Moreover, simultaneous adjustment of the operating variables can lead to faster process adjustments, which can reduce overall production times and cost. Thus, the fusion draw apparatus 101 and method 301 described above can provide a way to quickly adjust operating variables of the thermal elements 137 as desired while inhibiting unwanted instabilities.

Turning now to FIG. 4, a second example method 401 will now be described that can manage the plurality of stabilizing elements of the fusion draw apparatus 101 described above and thus accommodate for an instability detected in the glass ribbon 115. The second example method 401 comprises a step 403 of drawing the glass ribbon 115 from a quantity of molten glass from the forming wedge 103 in the downward draw direction 117. In such an example, the glass ribbon 115 includes the width W extending along the profile axis 121 and the thickness T extending between the first and second major surfaces 131, 133 of the glass ribbon 115. During the step 403, the controller 159 can operate the plurality of stabilizing elements according to a first operating profile.

The first operating profile can be designed to achieve target attributes in the glass ribbon 115. Such target attributes may require a certain thickness or temperature profile along the profile axis 121 of the glass ribbon 115. Accordingly, the first operating profile can be designed to facilitate maintenance of a first thickness and/or first temperature profile of the glass ribbon 115. For example, the first operating profile may be designed to operate the thermal elements 137 such that the glass ribbon 115 is provided with a first temperature profile along the profile axis 121. In another example, the first operating profile may be designed such that the first and second pulling rolls 143a, 143b are engaged with the glass ribbon 115 and separated by a certain operating distance, thereby facilitating maintenance of the first predetermined thickness. In yet another example, the first operating profile may be designed such that the first and second pulling rolls 143a, 143b are set to a first pulling roll speed, thereby facilitating maintenance of the first thickness. The first operating profile can be deigned to operate any of the stabilizing elements of the fusion draw apparatus 101 in any manner.

The second example method 401 next comprises the step 405 of detecting an instability in the glass ribbon 115. For example, the instability may be detected using the instability detector 151 discussed above or any of the other instability detectors also described. Moreover, the instability may comprise any of the instabilities discussed above such as, for example, a discontinuity in the glass ribbon 115. Once the instability is detected, an input may be provided to the controller 159 automatically by the instability detector 151 to indicate that the instability is present. The input by the instability detector 151 may be a physical, electronic signal sent to the controller 159 or the input may simply be the absence of such a signal. Moreover, the input may continue to be provided to the controller 159 until the instability is no longer present. In this manner, the instability detector 151 can operate as a stability detector as well, since the loss of the input indicates that the instability is no longer present.

In response to detecting the instability, the example method 401 can further comprise a step 407 of automatically adjusting the operating variables of the plurality of stabilizing elements simultaneously with the controller 159 to at least partially counter the detected instability. More specifically, upon receipt of the input from the instability detector 151 indicating that the instability is present, the first operating profile of the stabilizing elements can be automatically switched by the controller 159 to a second operating profile to at least partially counter the detected instability. For example, the controller 159 can be in communication with a plurality of predetermined operating profiles and based on the input provided to the controller 159, the controller 159 will select one of the predetermined operating profiles and automatically adjust the operating variables of the plurality of stabilizing elements simultaneously to achieve the selected operating profile. For instance, if an input A is provided to the controller 159 that indicates a first type of instability, the controller 159 may select one of the predetermined operating profiles and automatically change the first operating profile to the corresponding predetermined operating profile. As an alternative example, if an input B is provided to the controller 159 corresponding to a second type of instability, the controller 159 may select a different predetermined operating profile and automatically change the first operating profile to the corresponding predetermined operating profile. The selected operating profile will depend on what input is provided to the controller 159.

Each of the plurality of predetermined operating profiles can be designed to at least partially counter detected instabilities in various ways. For example, one predetermined operating profile can be designed to facilitate maintenance of a second thickness of the glass ribbon 115 that is predetermined and greater than the first thickness facilitated by the first operating profile in step 403, thus stiffening the glass ribbon 115 and making the glass ribbon 115 more resistant to breakage. For instance, if engaged with the glass ribbon 115, the operating distance between the first and second pulling rolls 143a, 143b may be automatically increased by the controller 159 to allow for thickened edges of the glass ribbon 115 between the first and second pulling rolls 143a, 143b. Additionally or alternatively, the pulling roll speeds of the first and second pulling rolls 143a, 143b may be decreased with the controller 159 to increase the thickness T of the glass ribbon 115 along the width W between the edges of the glass ribbon. As another example, one predetermined operating profile may be designed to facilitate a disengaged contact status of the first and second pulling rolls 143a, 143b. For instance, if the first and second pulling rolls 143a, 143b are engaged with the major surfaces 131, 133 of the glass ribbon 115 when the instability is detected, the operating distance between the first and second pulling rolls 143a, 143b may be automatically increased by the controller 159 such that the contact status of the first and second pulling rolls 143a, 143b automatically switches from an engaged status to a disengaged status. The disengaged status of the pulling rolls can allow the glass ribbon 115 to hang unconstrained and not in contact with the first and second pulling rolls 143a, 143b during instability. As such, under certain circumstances breakage can be avoided that might otherwise occur by restraining the first and second pulling rolls 143a, 143b. As yet another example, one predetermined operating profile may be designed to facilitate maintenance of a second temperature profile of the glass ribbon 115 that is predetermined and higher in average temperature than the first temperature profile facilitated by the first operating profile in step 403. The higher average second temperature profile may mitigate the risk of crack propagation in the glass ribbon 115. For instance, the heating parameters of each thermal element 137 may be adjusted simultaneously by the controller 159 to increase the amount of heat applied by the thermal elements 137 to the glass ribbon 115 and provide the predetermined second temperature profile that has an average temperature that is greater than the average temperature of the first temperature profile. As still yet another example, one predetermined operating profile may be designed to facilitate a second pulling roll speed for the first and second pulling rolls 143a, 143b that is predetermined and slower than the first pulling roll speed facilitated by the first operating profile in step 403, thus making it easier for operators or draw machinery to handle the glass ribbon 115 and correct the instability. The predetermined operating profiles may be designed to operate any of the stabilizing elements of the fusion draw apparatus 101 in any manner to at least partially counter detected instabilities.

The controller 159 can simultaneously adjust any combination of the adjustable operating variables of the stabilizing elements of the fusion draw apparatus 101 to achieve the predetermined second profile in step 407. Moreover, although the controller 159 can adjust these operating variables simultaneously, the adjustment of each variable need not always be simultaneous with the others. For instance, the controller 159 may begin adjustment of a first operating variable and after a set time, begin adjustment of a second operating variable while simultaneously still providing adjustment to the first operating variable. Indeed, some variables may not even need adjustment to automatically switch the operating profile of the stabilizing elements to the stabilizing profile in step 407.

Eventually, the step 407 of automatically adjusting the operating variables of the plurality of stabilizing elements to at least partially counter the instability detected in step 405 may lead to a stabilization of the glass ribbon 115. Accordingly, the example method 401 can further comprise the step 409 of detecting a stability in the glass ribbon 115. As mentioned above, since the loss of the input provided by the instability detector 151 to the controller 159 can indicate that the instability detected in step 405 is no longer present, the instability detector 151 can also act as a stability detector. However, other embodiments of the fusion draw apparatus 101 may comprise a separate device configured to detect a stability in the glass ribbon 115 and provide a separate input to the controller 159 indicating that the stability is present.

In response to detecting the stability, the example method 401 can further comprise the step 411 of automatically switching the second operating profile of the stabilizing elements back to the first operating profile with the controller 159. More specifically, upon loss of the input from the instability detector 151 indicating that the instability is present, the operating variables of the plurality of stabilizing elements can be adjusted simultaneously with the controller 159 to achieve the first operating profile. The stabilizing elements can continue to operate under the original first operating profile until an instability is detected again or the process is terminated.

The method 401 described above can allow for the simultaneous adjustment of operating variables of the stabilizing elements in response to a detected instability. This simultaneous adjustment can at least partially counter the detected instability and inhibit the occurrence of further instabilities that may otherwise occur if each of the operating variables were adjusted sequentially. Moreover, simultaneous adjustment of the operating variables can lead to faster process adjustments, which can reduce overall production times and cost. Furthermore, once the glass ribbon 115 has been stabilized, the method 401 can allow for the simultaneous adjustment of the operating variables of the stabilizing elements back to their original operating conditions.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method for producing a glass ribbon comprising:
   (I) drawing a glass ribbon from a quantity of molten glass;
   (II) detecting an instability in the glass ribbon during step (I), the instability selected from the group consisting of: vibrations in the glass ribbon, a crack in the glass ribbon, and a full break in the glass ribbon; and in response to detecting the instability,
   (III) simultaneously adjusting an independently adjustable operating variable of all thermal elements of a plurality of thermal elements automatically to increase a thickness of the glass ribbon to at least partially counter the detected instability.

2. The method of claim 1, wherein during step (I), all of the thermal elements of the plurality of thermal elements are operated with a first operating profile.

3. The method of claim 2, wherein during step (III), the first operating profile of all of the thermal elements of the plurality of thermal elements is automatically switched to a second operating profile to at least partially counter the detected instability.

4. The method of claim 3, wherein step (III) includes selecting the second operating profile from a plurality of predetermined operating profiles based on the detected instability.

5. The method of claim 3, wherein the first operating profile facilitates maintenance of a first thickness of the glass ribbon and the second operating profile facilitates maintenance of a second thickness of the glass ribbon that is greater than the first thickness.

6. The method of claim 3, wherein after step (III), further comprising,
(IV) detecting a stability in the glass ribbon; and then in response to detecting the stability,
(V) automatically switching the second operating profile of all of the thermal elements of the plurality of thermal elements back to the first operating profile.

7. The method of claim 1, wherein the independently adjustable operating variable for each thermal element of the plurality of thermal elements comprises a heating parameter of the thermal element, and step (III) at least partially counters the detected instability by simultaneously adjusting the heating parameter of all of the thermal elements of the plurality of thermal elements to increase a temperature of the glass ribbon.

8. The method of claim 1 further comprising the step of:
(IV) adjusting an independently adjustable operating variable of all pulling rolls of a plurality of pulling rolls automatically to at least partially counter the detected instability.

9. The method of claim 8, wherein the independently adjustable operating variable for each pulling roll of the plurality of pulling rolls comprises a contact status of the pulling roll with the glass ribbon, wherein during step (III) the contact status of the pulling roll is automatically switched from an engaged position wherein the pulling roll contacts the glass ribbon to a disengaged position wherein the pulling roll is not in contact with the glass ribbon.

10. The method of claim 8, wherein the independently adjustable operating variable for each pulling roll of the plurality of pulling rolls comprises a pulling roll speed of the pulling roll.

11. A method for producing a glass ribbon comprising:
(I) drawing a glass ribbon from a quantity of molten glass;
(II) detecting an instability in the glass ribbon; and in response to detecting the instability;
(III) simultaneously adjusting an independently adjustable operating variable of all thermal elements of a plurality of thermal elements automatically to control a thickness of the glass ribbon to at least partially counter the detected instability;
during step (I), all of the thermal elements of the plurality of thermal elements are operated with a first operating profile;
during step (III), the first operating profile of all of the thermal elements of the plurality of thermal elements is automatically switched to a second operating profile to at least partially counter the detected instability; and
the first operating profile facilitates maintenance of a first thickness of the glass ribbon and the second operating profile facilitates maintenance of a second thickness of the glass ribbon that is greater than the first thickness.

12. A method for producing a glass ribbon comprising:
(I) drawing a glass ribbon from a quantity of molten glass;
(II) detecting an instability in the glass ribbon; and in response to detecting the instability,
(III) simultaneously adjusting an independently adjustable operating variable of all thermal elements of a plurality of thermal elements automatically to control a thickness of the glass ribbon to at least partially counter the detected instability by simultaneously adjusting the operating variable of all of the thermal elements of the plurality of thermal elements to increase a thickness of the glass ribbon.

13. The method of claim 12, wherein during step (I), all of the thermal elements of the plurality of thermal elements are operated with a first operating profile, wherein during step (III), the first operating profile of all of the thermal elements of the plurality of thermal elements is automatically switched to a second operating profile to at least partially counter the detected instability, and wherein the first operating profile facilitates maintenance of a first thickness of the glass ribbon and the second operating profile facilitates maintenance of a second thickness of the glass ribbon that is greater than the first thickness.

* * * * *